(12) United States Patent
Sun (10) Patent No.: US 7,746,641 B2
(45) Date of Patent: Jun. 29, 2010

(54) RADIATION DEVICE FOR COMPUTER OR ELECTRIC APPLIANCES

(76) Inventor: Yuan-Hsin Sun, P.O. Box 697, Fongyuan City 420, Taichung County (TW)

(*) Notice: Subject to any disclaimer, the term of this patent is extended or adjusted under 35 U.S.C. 154(b) by 324 days.

(21) Appl. No.: 11/790,924

(22) Filed: Apr. 30, 2007

(65) Prior Publication Data

US 2008/0266788 A1    Oct. 30, 2008

(51) Int. Cl.
*H05K 7/20* (2006.01)
*F28F 7/00* (2006.01)
*H01L 23/34* (2006.01)
*F25B 21/02* (2006.01)

(52) U.S. Cl. ............... 361/700; 361/679.52; 165/80.4; 165/80.5; 257/714; 257/715; 174/15.2; 174/16.3; 62/3.2

(58) Field of Classification Search ......... 361/698–700; 257/714–715, 722; 165/80.2–80.5, 104.33, 165/104.19; 174/15.2, 16.6; 62/3.2

See application file for complete search history.

(56) References Cited

U.S. PATENT DOCUMENTS

| | | | |
|---|---|---|---|
| 6,181,556 B1* | 1/2001 | Allman | 361/690 |
| 6,880,346 B1* | 4/2005 | Tseng et al. | 62/3.7 |
| 2006/0151146 A1* | 7/2006 | Chou et al. | 165/10 |
| 2007/0234741 A1* | 10/2007 | Lee et al. | 62/3.2 |
| 2008/0043438 A1* | 2/2008 | Refai-Ahmed | 361/700 |

* cited by examiner

*Primary Examiner*—Zachary M Pape (57) ABSTRACT

A radiation device for computer or electric appliances includes a heat inhalant block under a CPU of a computer, a heat transmission block positioned next to the heat inhalant block, a bridge block, a peltier device and a cooling source block sequentially disposed on the top of the heat transmission block with a bridge block engaged therebetween, a transparent cover covering the top of the cooling source block to form a left and a right flow canals therein, an upper heat radiation module superimposed a lower heat radiation module positioned next to the heat transmission block, a fan on the top of the upper heat radiation module, a set of the heat pipes extended from the heat inhalant block to the lower heat radiation module through the heat transmission block, a pair of lateral pipes connected between the bridge block and the lower heat radiation module and a set of the cold pipes connected between the cooling source block and the upper heat radiation module.

4 Claims, 12 Drawing Sheets

RADIATION DEVICE FOR COMPUTER OR ELECTRIC APPLIANCES

BACKGROUND OF THE INVENTION

The present invention relates to a heat radiation devices and more particularly to a radiation device for computer or electric appliances which includes the cold pipe and the peltier in cooperation with a number of heat radiation components.

The computer is comprised of small and accurate parts. The lives of the electronic parts are shorten because of the high temperature resulting from the processing of the CPU, especially the heat generating from the radiation plates and fans on the top of the CPU. Nowadays, various types of computers, such as the note-book type, mini-type or thin type computers and/or the appliances are improved to expedite the speed of processing (rotation), wherein the processing speed of the CPU over 3.2 GHZ, the 64 bit CPU or multi-core technique is the new trend, however such a new technique will cause a high temperature to damage the related components of the computer. Thus the manufactures research and improve the heat radiation, especially in the radiation fins as well as the radiation fan.

SUMMARY OF THE PRESENT INVENTION

The present invention has a main object to provide a radiation device for computer or electric appliances to keep the computer processing at high speed and heat radiation.

Another object of the present invention is to provide a radiation device for computer and electric appliances to rapidly radiate for double-core, three-core, four-core and/or or multi-core central processing unit (CPU).

Further object of the present invention is to provide a radiation device for computer or electric appliances which allows a changeable section of bridge block, peltier device and cooling source block with the upper heat radiation module, and lower heat radiation module of other section to facilitate string type double-core to transmission heat source and heat radiation efficiently.

Accordingly, a radiation device for computer and electric appliances of the present invention comprises generally:

a heat inhalant block positioned at the heat source of the computer;

a heat transmission block has a bridge block on the stop thereof and a peltier device with a heat cooling source block being fixed on the top of the bridge block, wherein the peltier device has a cold surface where creates cooling source, the opposite side of the cold surface is a heat surface to generate heat, the cold surface engages with the heat cooling source block, and the heat surface engages with the bridge block;

an upper heat radiation module having a plurality of heat radiation plates and a fan to blow the heat away;

a lower heat radiation module on an underside of the upper radiation block having a plurality of heat radiation plates;

a number of heat pipes leading the heat from the heat inhalant block to the heat transmission block and then to the lower heat radiation module;

a number of lateral pipes leading the heat from the bridge block to the lower radiation module as well;

a number of cooling pipes leading the cold air from the heat module source block to the upper heat radiation module;

thereby, the heat source from the heat inhalant block is led to the heat transmission block together with the heat source from the heat surface of the peltier device to the bridge block, then flows to the lower heat radiation module, and then the cooling source from the peltier device is led to the upper heat radiation module through the cooling pipes, the upper heat radiation module cools the lower heat radiation module and an electric fan begins to blow the heat away from the upper and lower heat radiation modules so as to effectively and rapidly achieve the heat radiation purpose for the computer or the electric appliances.

The present invention will become more fully understood by reference to the following detailed description thereof when read in conjunction with the attached drawings.

DETAILED DESCRIPTION OF THE PREFERRED EMBODIMENT

With reference to the drawings and initiated from FIGS. 1 to 6, the radiation device of the present invention adapted for a computer or Note-book type computer or the electric appliances is connected to the computer and comprises generally a heat inhalant block 10, a heat transmission block 20, a bridge block 30, a peltier device 40, a cooling source block 50, an upper heat radiation module 60, a lower heat radiation module 70, a number of heat pipes 11, a number of lateral pipes 31 and a number of cold pipes 51.

The heat inhalant block 10 is positioned at a heat radiating spot of a computer (in this embodiment, the heat radiating spot is the CPU 1) and has three insertion holes 12 through the body.

The heat transmission block 20 is positioned next to the heating inhalant block 10 and has three insertion holes in the body.

The bridge block 30 is positioned on the top of the heat transmission block 20 and is shaped like an arched bridge.

The peltier device 40 and the cooling source block 50 are positioned on the top of the bridge block 30, wherein the peltier device has a cold upper surface 41 capable of creating cooling source and a heated lower surface 42 capable of creating high temperature energy. The cold upper surface 41 is close to the cooling source block 50, and the heated lower surface 42 is close to the bridge block 30, the peltier device 40 wholly forms a freezing lower temperature block which is capable of swiftly decreasing the temperature for the cooling source block 50 which has three insertion through holes 52 and the bridge block 30 has an insertion through hole 32 in each of the lateral sides.

The upper heat radiation module 60 is positioned next to the cooling source block 50 and has a plurality of radiating plates (fins) and a fan 80 on the top thereof to blow the cold air downward from the upper heat radiation module 60 which has three insertion through holes 61 in the body.

The lower heat radiation module 70 is close to the bottom of the upper heat radiation module 60 and has a plurality of radiating plates (fins) but five insertion through holes to receive the heat pipes 11 and the lateral pipes 31. The three heat pipes 11 begin from the heat inhalant block 10 and end into the lower heat radiation module 70 through the heat transmission block 20, the two lateral pipes 31 are connected between the bridge block 30 and the lower heat radiation module 70, the three cold pipes 51 from the cooling source block 50 are interred into the upper heat radiation module 60, a transparent cover 90 on the top of the cooling source block 50 is formed a left flow canal 91 and a right flow canal 92 in the lateral sides thereof.

The heat pipes 11 and the cold pipes 51 are made of copper, aluminum or other metallic materials, they may be groove type or wilded pipe with copper powders, the heat pipes 11 may be called as normal temperature pipe in side which is dielectric such as pure water, where the cold pipe 51 is a low temperature pipe into which the ammonia or other dielectric is fixed, when their molecules receive the hot energy, the hot energy will be highly evaporated and flowed back from the condensed portion, so that the heat source is transmitted by using wave style, the speed of transmission in comparison with the metal bar or radiation plate is quicker than several folds up to over ten folds upon there specialty, the heat pipes 11 and the cold pipe 51 are capable of leading the heat source from the heat inhalant block 10 to the heat transmission block at high speed.

When the fan 80 blows the cold air from the upper heat radiation module 60 to the lower heat radiation module 70, the heat is discharged into the left flow canal 91 and fows out of the right flow canal 92 of the cover 90.

Figure 1:
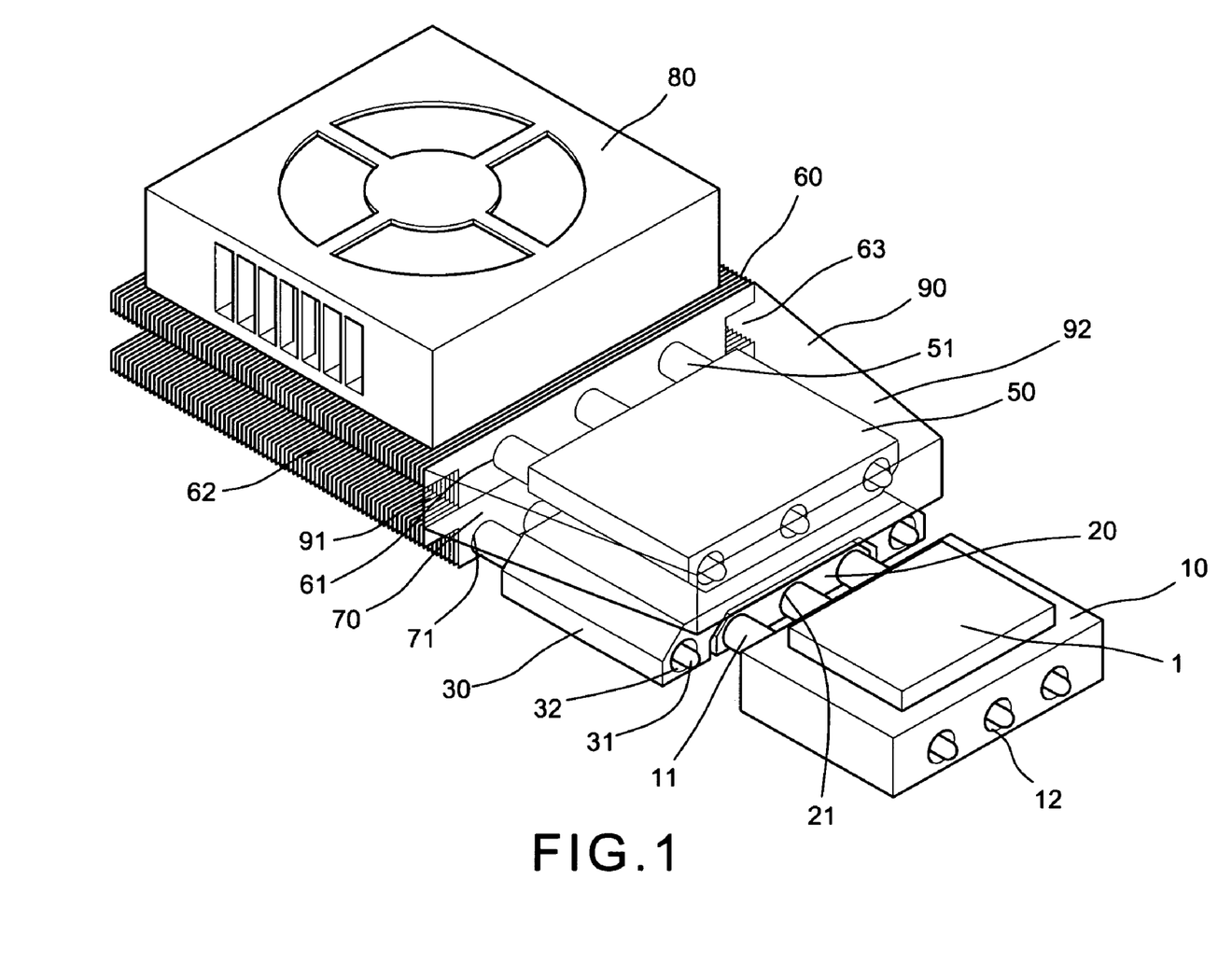
FIG. 1 is a perspective view to show the preferred embodiment of the present invention.
Figure 2:
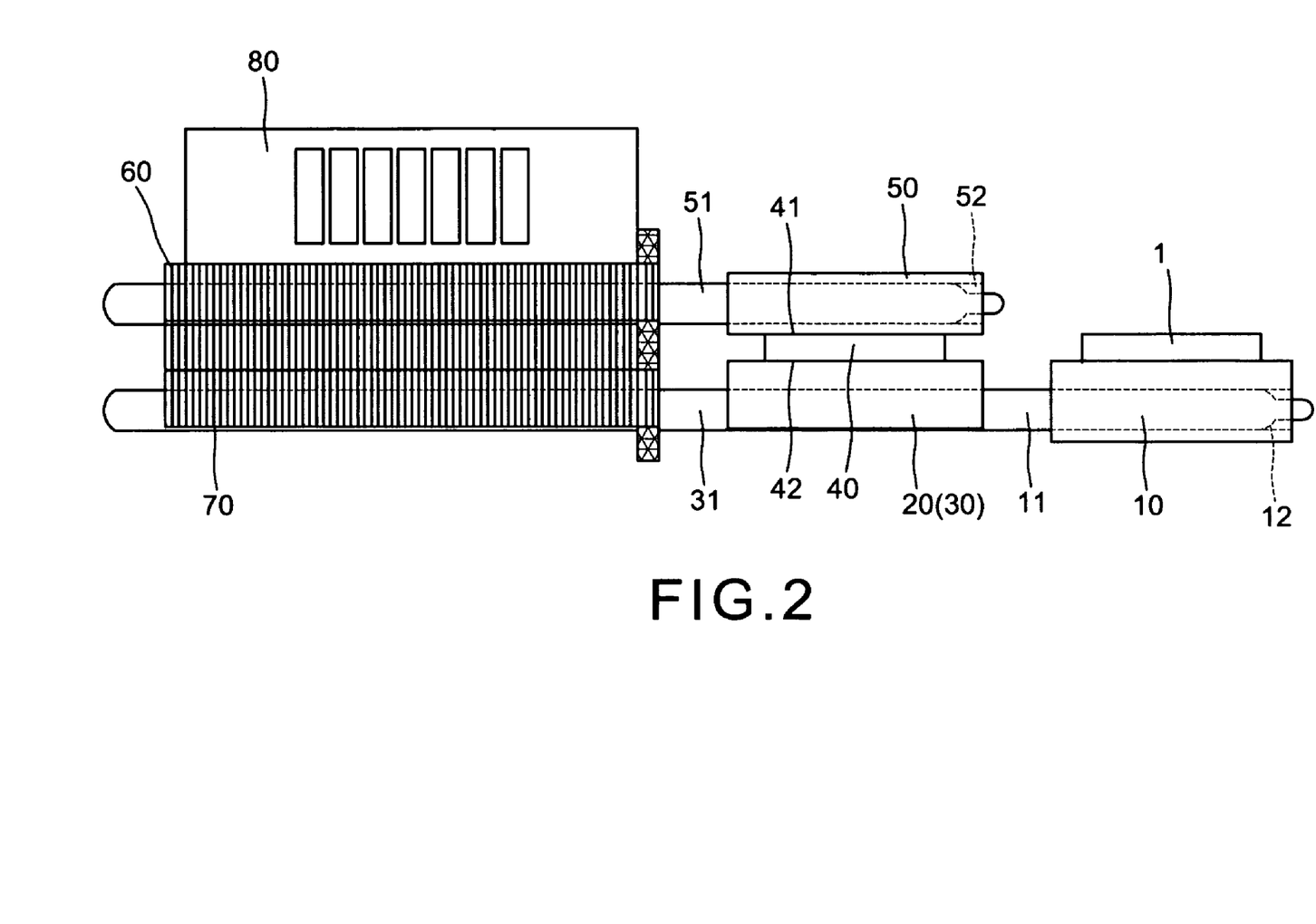
FIG. 2 is a plane view of FIG. 1 looking from a lateral side.
Figure 3:
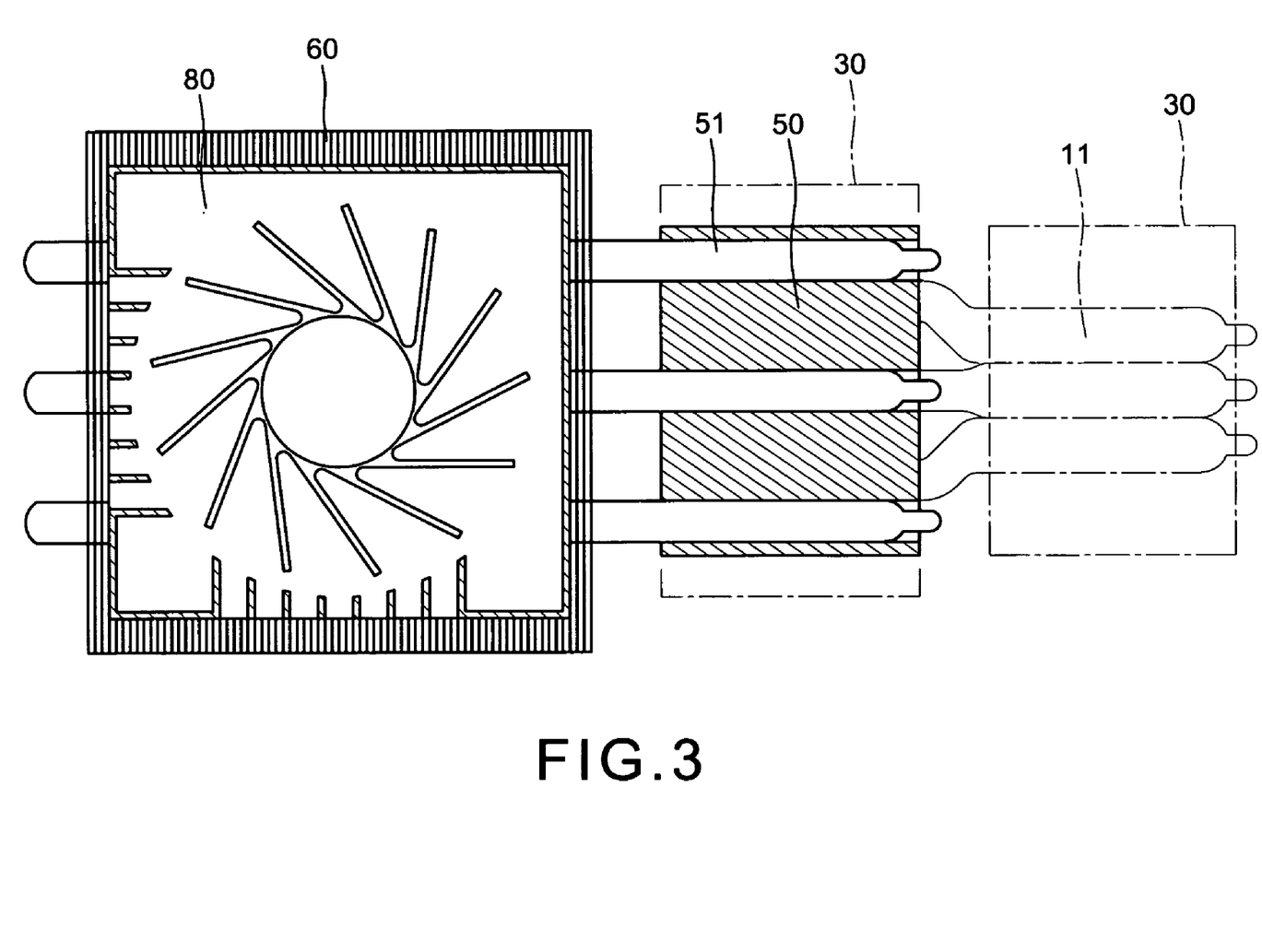
FIG. 3 is a cross sectional view to show a fan and cooling source block of the present invention.
Figure 4:
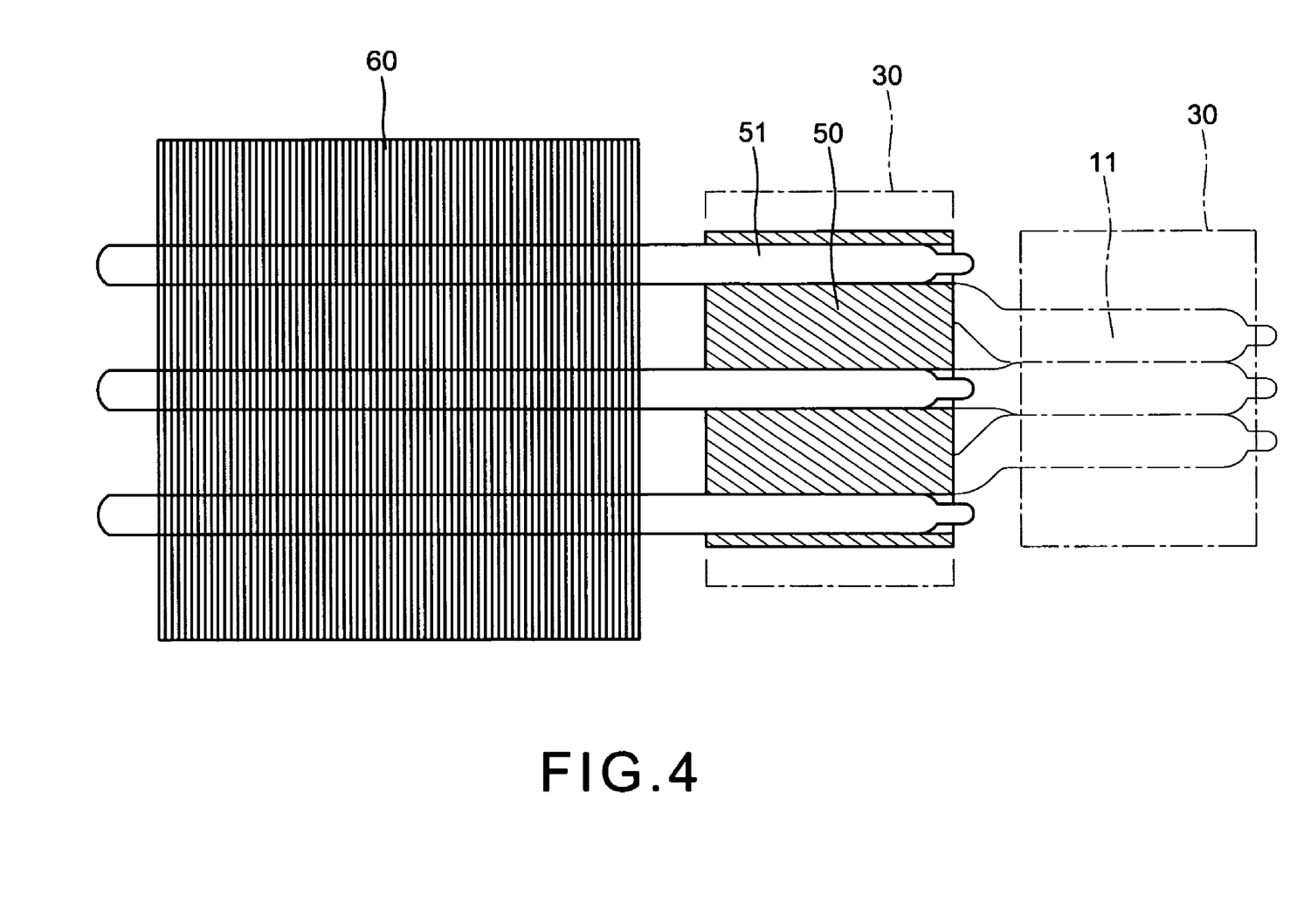
FIG. 4 is a cross sectional view to show an upper heat radiation module and a cooling source block of the present invention.
Figure 5:
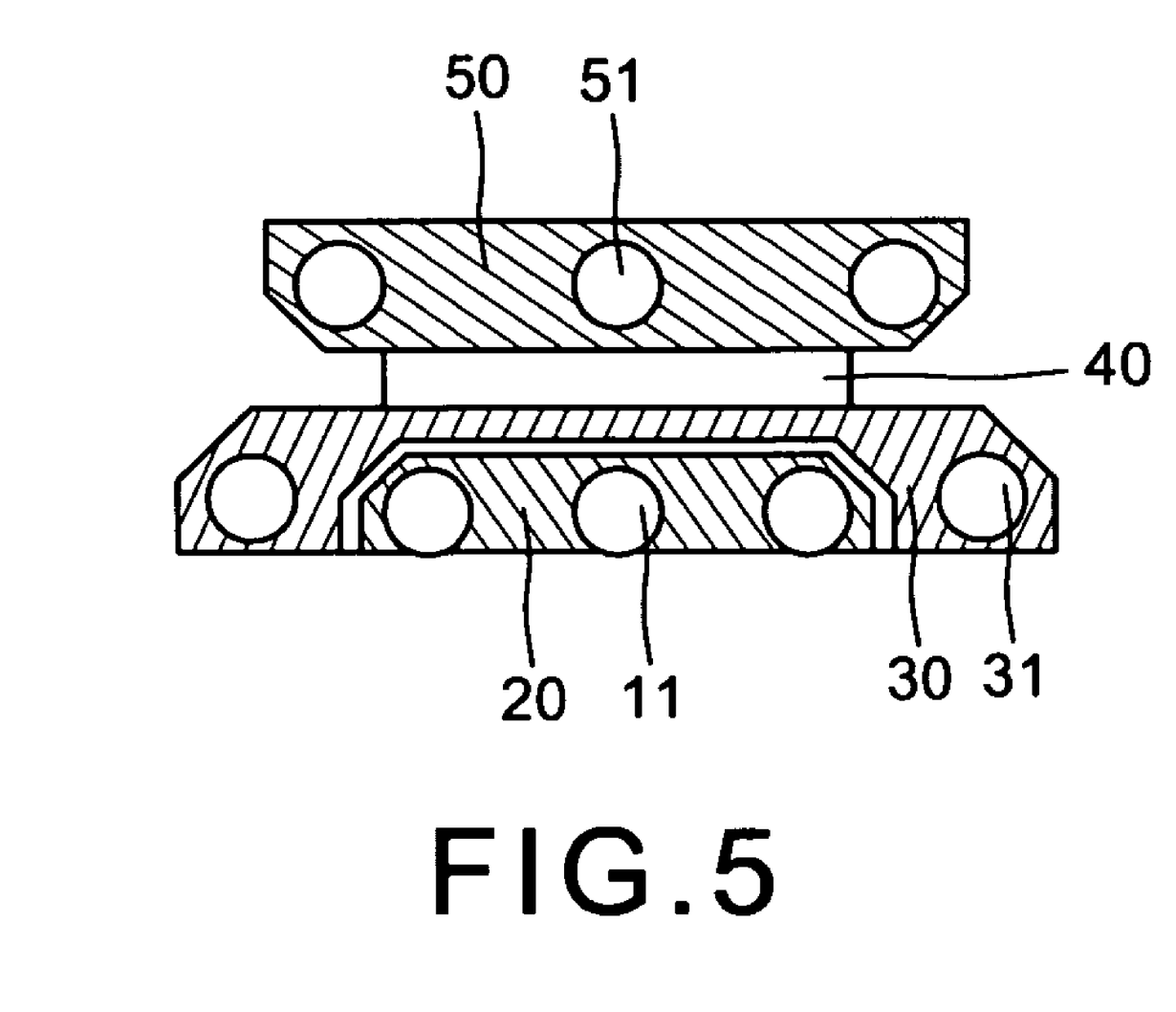
FIG. 5 is a cross sectional view to show a cooling source block, a peltier device, a bridge block and a heat transmission bock of the present invention.
Figure 6:
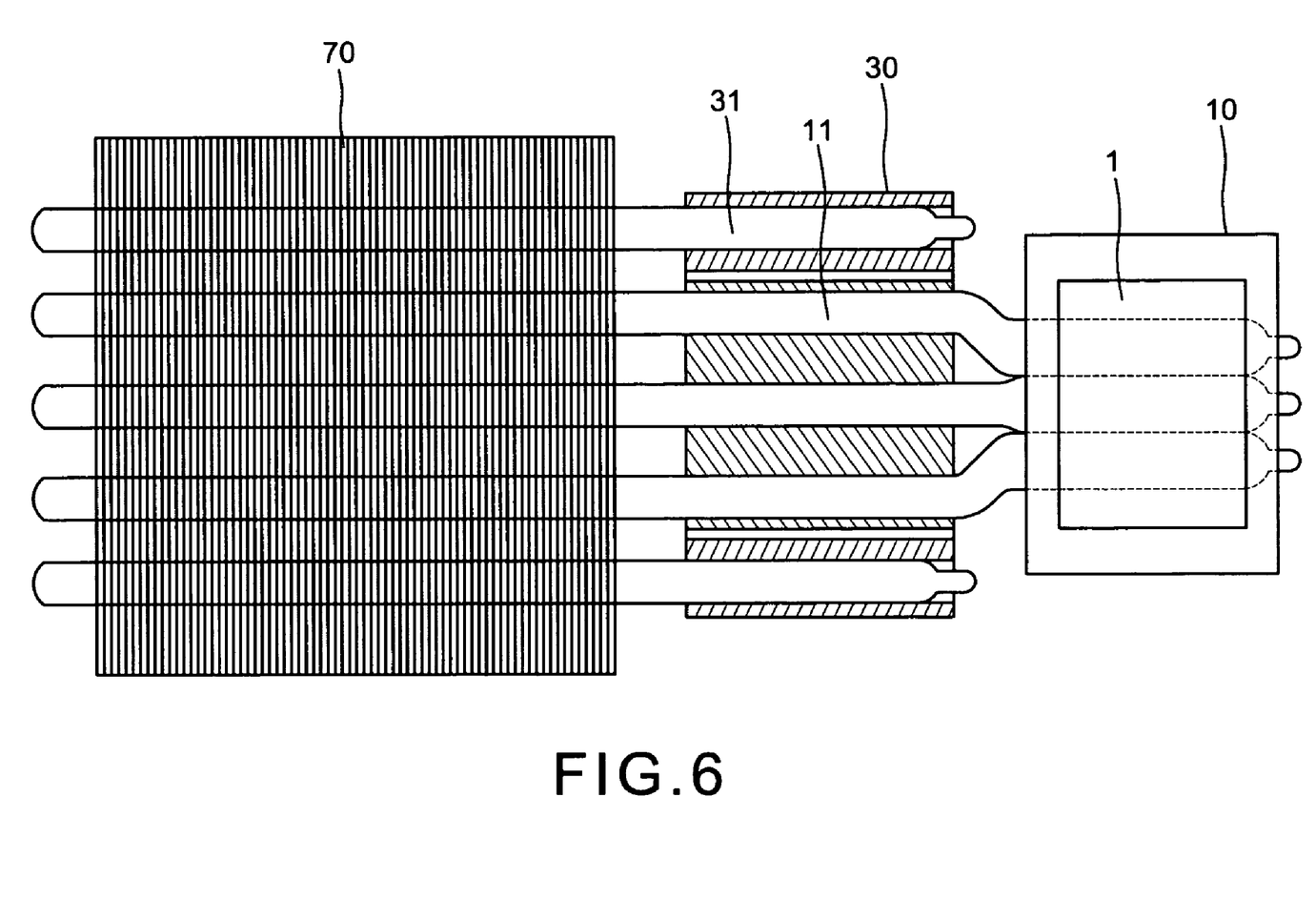
FIG. 6 is a cross sectional view to show a lower heat radiation module, a bridge block and a heat transmission block of the present invention.
Figure 7:
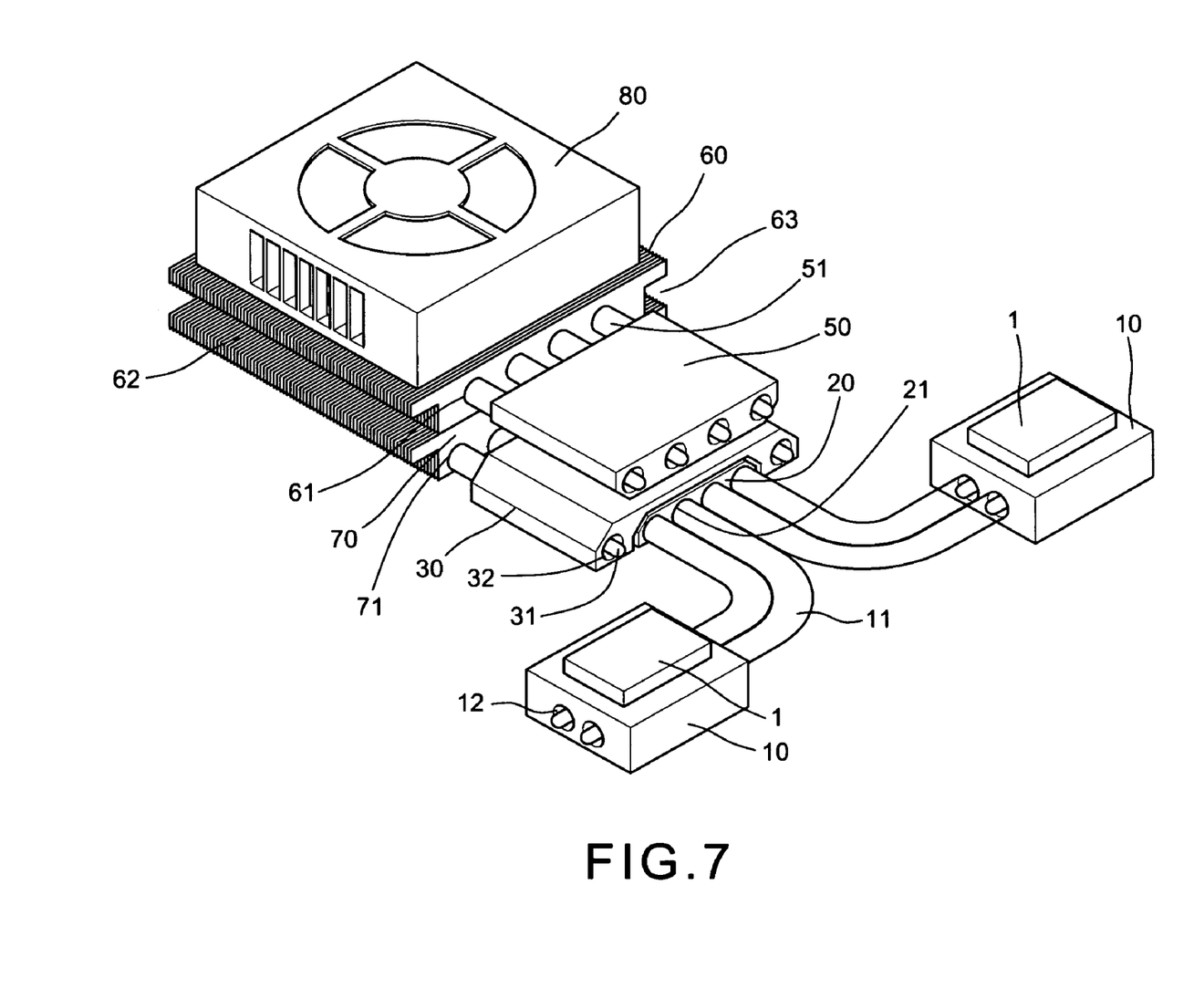
FIG. 7 is a perspective view indicating that the radiation device of the present invention is used in a double-cores computer.
Figure 8:
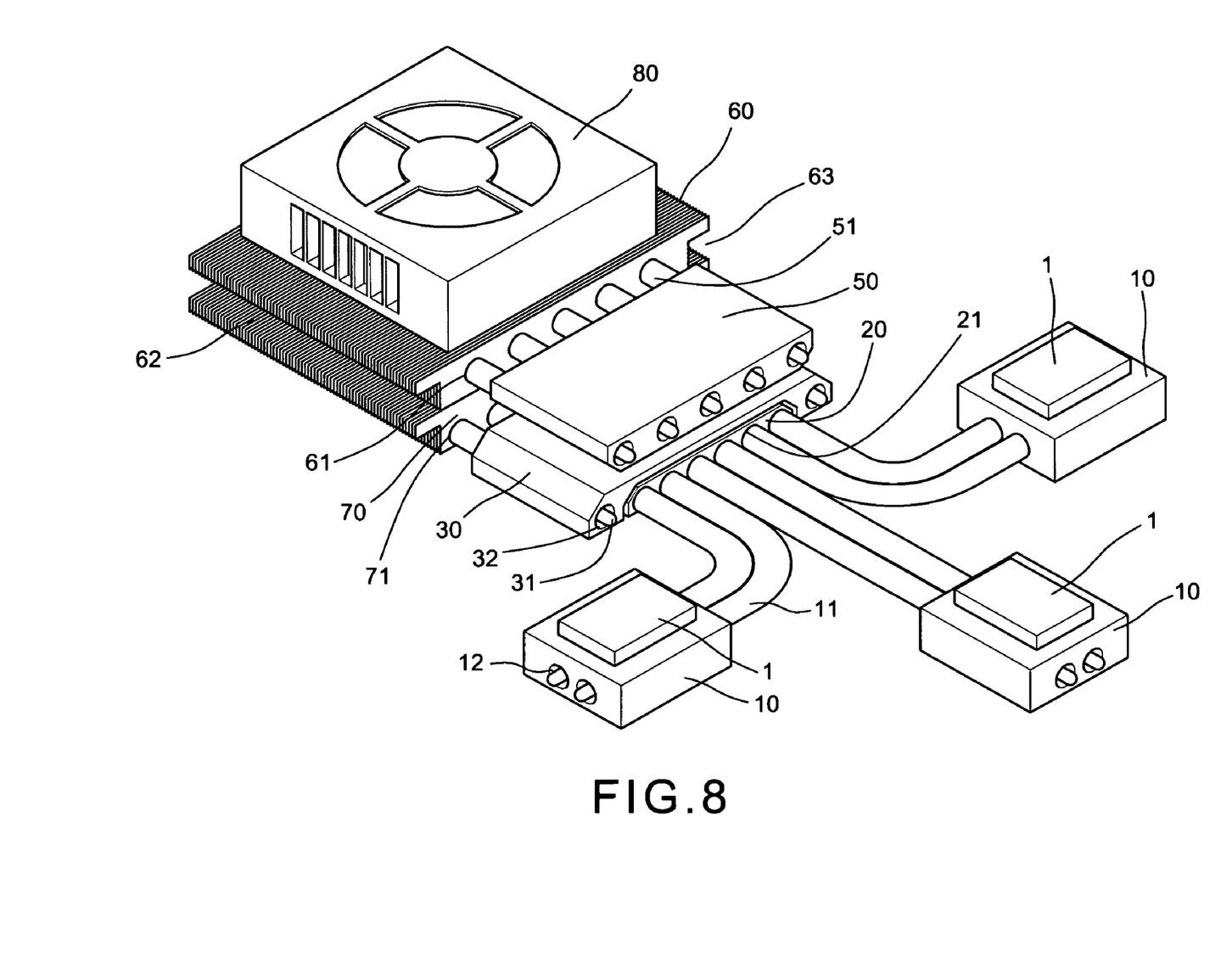
FIG. 8 is a perspective view indicating that the radiation device of the present invention is used in a three cores computer.
Figure 9:
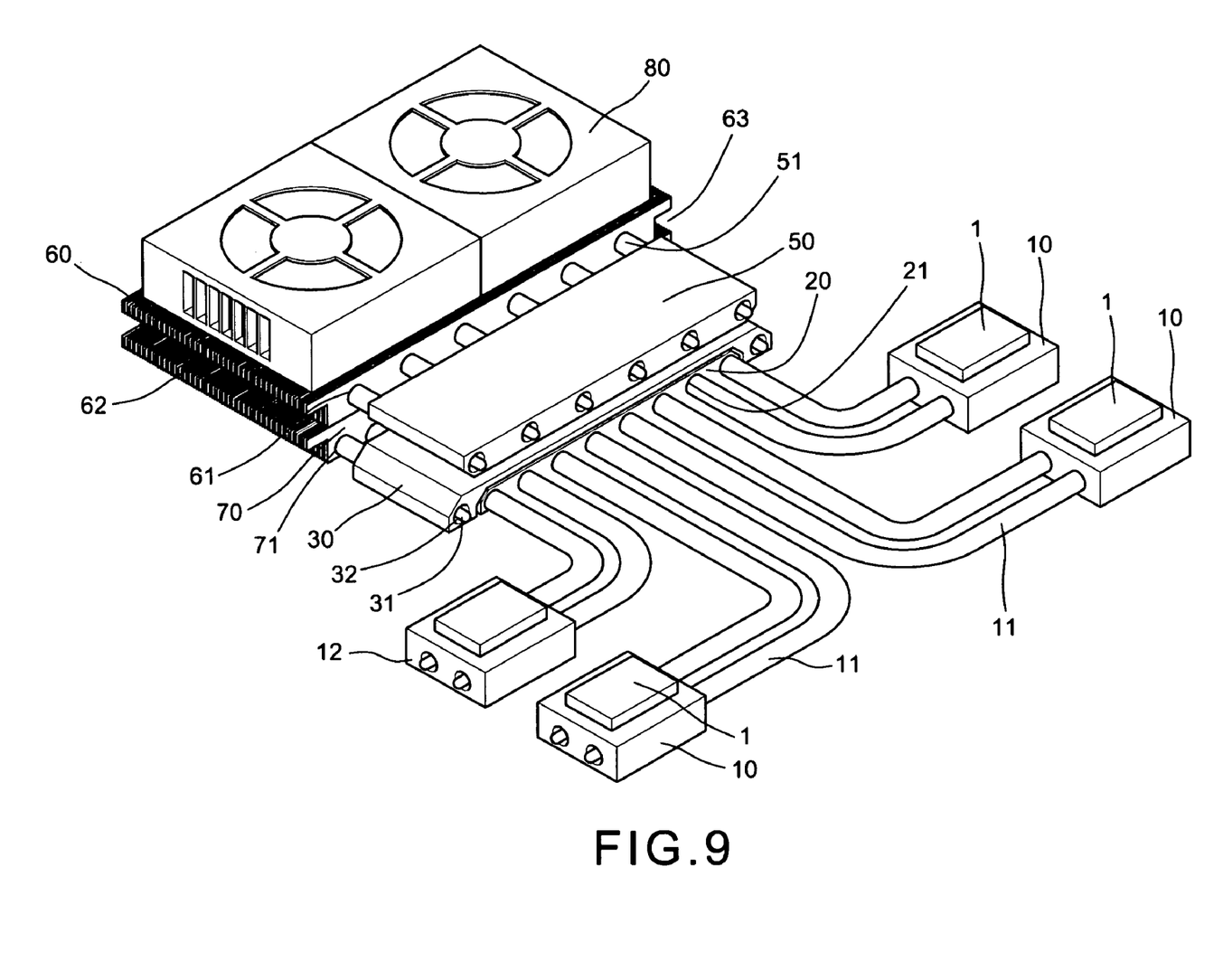
FIG. 9 is a perspective view indicating that the radiation device of present invention is used in four cores computer.

Referring to FIGS. 7, 8 and 9, if the radiation device once serves two CPUs (cores), three CPUs (cores) and/or four CPUs (cores), each of the cores connected with an inhalant block 10. In addition, more heat pipes 11 are connected with the heat transmission block 20.

Figure 10:
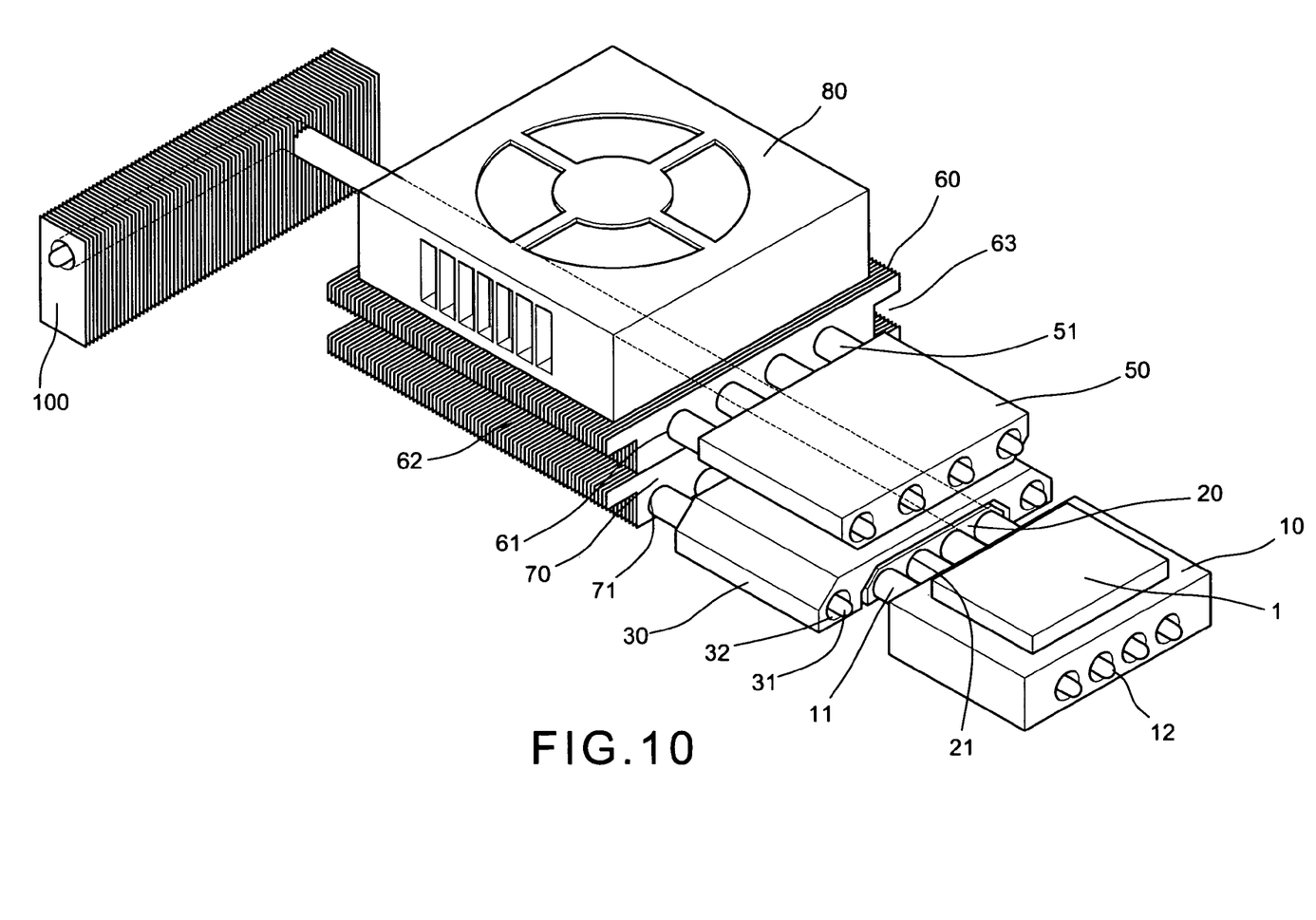
FIG. 10 is a perspective view to show an alternative arrangement of the present invention.
Figure 11:
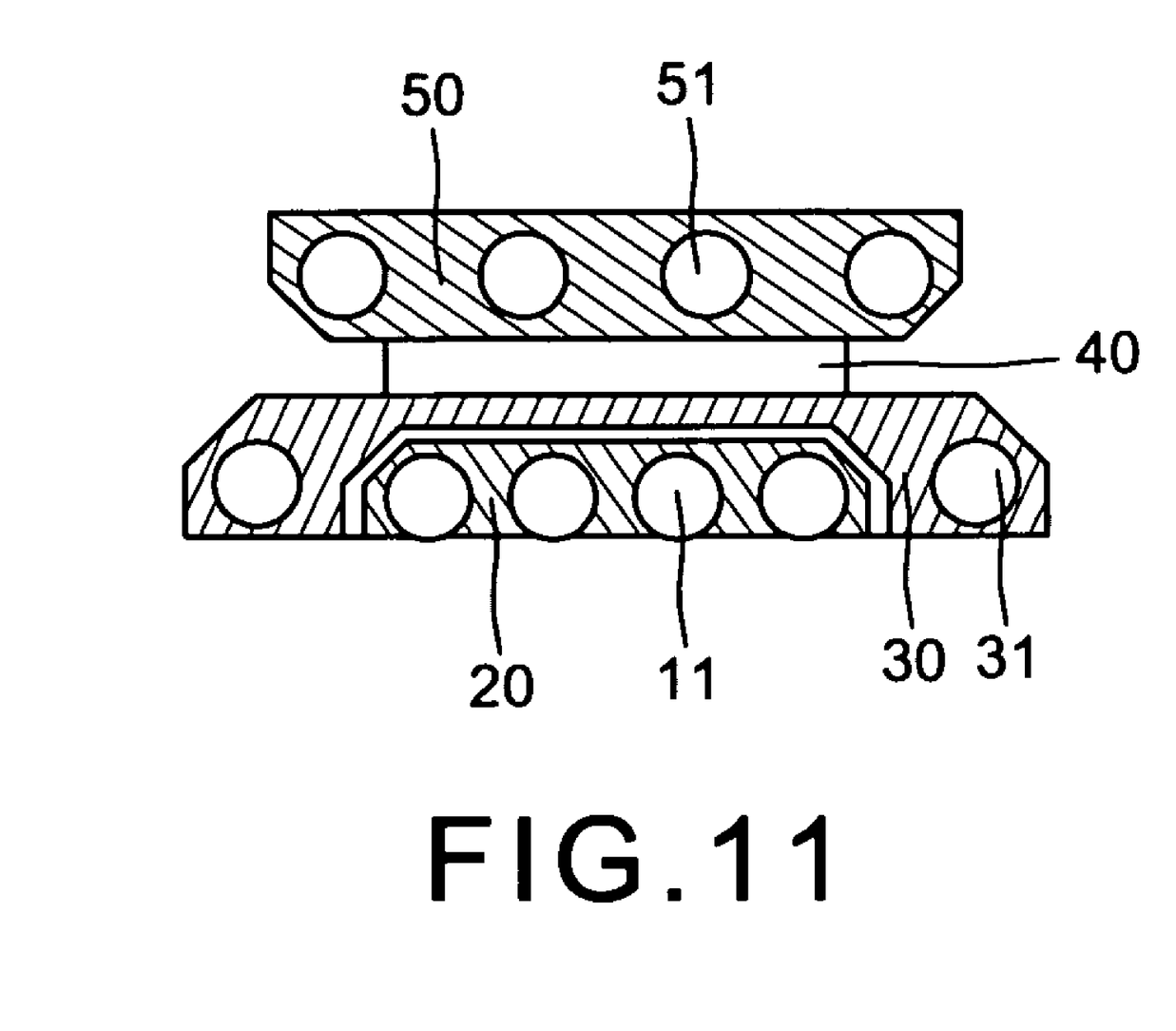
FIG. 11 is a cross sectional view to show the cooling source block, the peltier device, the bridge block and the heat transmission block of FIG. 10.

Referring to FIGS. 10 and 11, an alternate arrangement is provided. That is to add one of the heat pipes 11 to extend out of the lower heat radiation module 70 and to connect with a front heat radiation module 100, in the sometime, the cover 90 is removed, so when the cold air blows from the upper heat radiation module 60 to the lower heat radiation module 70, it also blows to the front heat radiation module 100, the hot air is discharged from the lateral sides of them.

Figure 12:
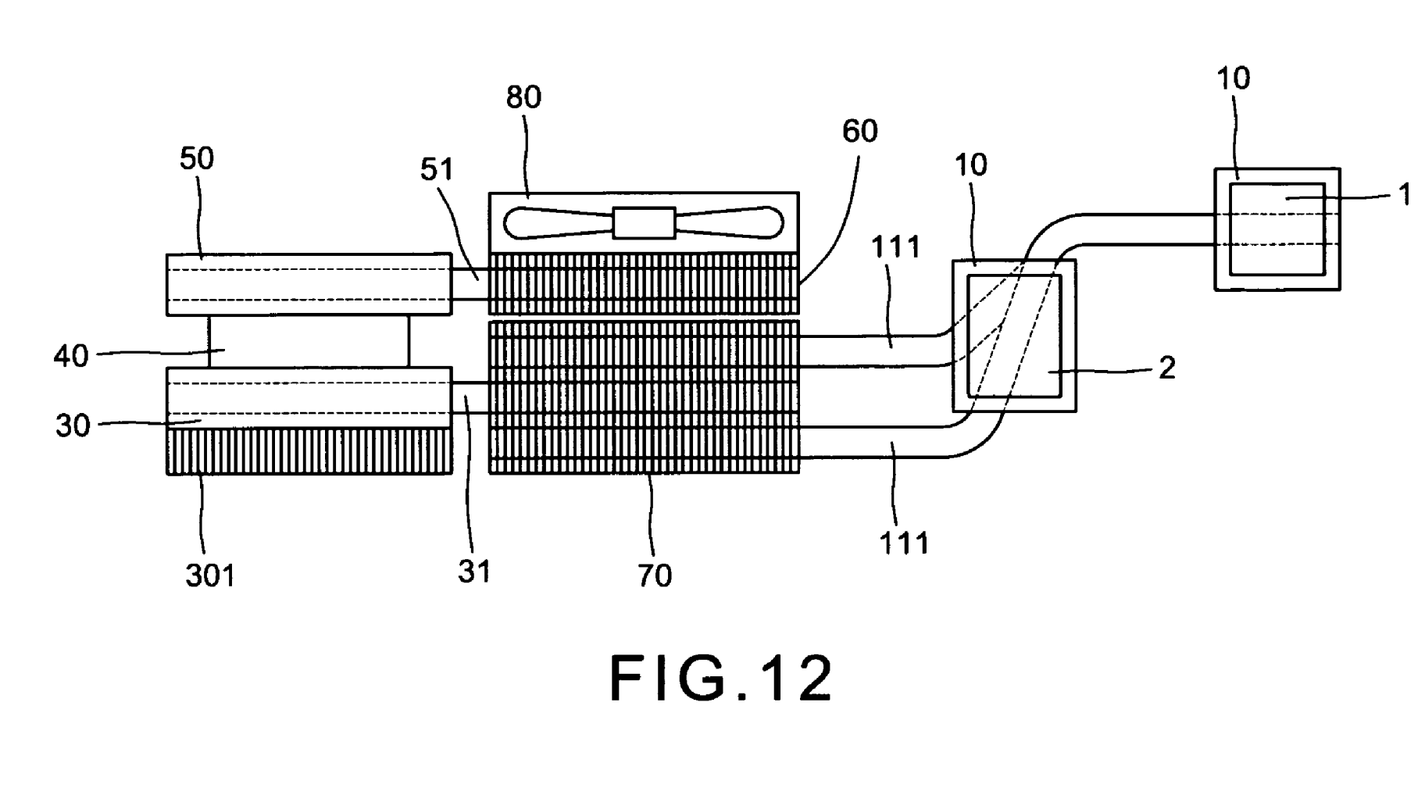
FIG. 12 is a plane view to show another arrangement of the present invention.

FIG. 12 shows another alternate arrangement that is to change the position of the bridge block 30, the peltier device 40, and the cool source block 50 with the upper and lower heat radiation modules 60 and 70, and the heat pipes 111 connects with the heat inhalant block 10 of one or two CPUs to extend into the lower heat radiation module 70, the lateral pipes 31 of the bridge block 30 also enters into the lower heat radiation module 70, the bridge block 30 has a plurality of radiation fins 301, the cold pipes 51 enter from the cooling source block 50 into the upper heat radiation module 60 on the top of the fan 80 is still existed. So that the heat source enters from the CPU or CPUs through the heat inhalant block or blocks and the heat pipes 111 into the lower heat radiation module 70 to radiate previously, the heat source of the peltier device 40 enters through the bridge block 30 into the lower heat radiation module 70, the cooling source enters from the peltier device 40 into the upper heat radiation module 60 through the cold pipes 51, the fan 80 blows the cold air from the upper heat radiation module 60 to the lower heat radiation module 70 to perform heat radiation action as discussed the above.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A radiation device for computer or electric appliances comprising:

a heat inhalant block being located under a heat radiating spot of a CPU and having three insertion holes through its body;

a heat transmission block positioned next to the heat inhalant block and having three insertion holes through its body and having a top;

a bridge block which is shaped like an arched bridge being positioned on the top of the heat transmission block and having an insertion hole in each of the lateral sides and having a top;

a peltier device together with a cooling source block positioned on the top of the bridge block, wherein the peltier device has a cold upper surface close to the cooling source block and has a heated lower surface close to the bridge block, the cooling source block has three insertion holes through its body;

an upper heat radiation module positioned next to the cooling source block and having a fan on its top, and having a plurality of radiating plates (fin) and three insertion hole through its body;

a lower heat radiation module positioned close to the bottom of the upper heat radiation module and having a plurality of radiating plates (fins) and five insertion holes in its body;

a transparent cover covering on a top of the cooling source block to form a left flow canal and a right flow canal therein;

three heat pipes full of pure water therein beginning from the heat inhalant block and ending into the lower heat radiation module through the heat transmission block;

two lateral pipes connected between the bridge block and the lower heat radiation module;

three cold pipes full of ammonia therein beginning from the cooling source block and ending in the upper heat radiation module;

whereby, the fan blows the cold air from the upper heat radiation module into the lower heat radiation module to expel the heat therein.

2. The radiation device as recited in claim 1, wherein the radiation device is capable of being used with up to four CPUs by adding another heat inhalant block and additional heat pipes.

3. The radiation device as recited in claim 1, wherein an elongated heat pipe is added and extends from the heat inhalant block through the heat transmission block, and the lower heat radiation module to be connected to an additional front heat radiation module on a front side.

4. The radiation device as recited in claim 1, wherein the pipes are made of copper and/or other metallic materials.

* * * * *